United States Patent
Cox, Jr. et al.

[15] 3,641,429
[45] Feb. 8, 1972

[54] POSITION-MEASURING TRANSDUCER COMPRISING A STATOR AND RELATIVELY MOVABLE FLUX-ALTERING MEMBER

[72] Inventors: Duncan B. Cox, Jr., Manchester; Kenneth Fertig, Brookline, both of Mass.

[73] Assignee: Massachusetts Institute of Technology, Cambridge, Mass.

[22] Filed: Dec. 24, 1969

[21] Appl. No.: 887,896

[52] U.S. Cl..........................324/34 PS, 310/168, 310/268, 336/132, 336/135, 340/195, 340/271
[51] Int. Cl.......................................................G01r 33/00
[58] Field of Search.............................324/34, 34 PS, 34 D; 318/652–670; 323/51; 336/135, 136, 130, 132; 340/195, 271, 282; 310/168, 268

[56] References Cited

UNITED STATES PATENTS

| | | | |
|---|---|---|---|
| 3,242,472 | 3/1966 | Anthony | 336/136 |
| 3,176,241 | 3/1965 | Hogan et al. | 324/34 X |

FOREIGN PATENTS OR APPLICATIONS

| | | | |
|---|---|---|---|
| 1,285,188 | 12/1968 | Germany | 336/135 |
| 783,549 | 9/1957 | Great Britain | 336/135 |

Primary Examiner—Rudolph V. Rolinec
Assistant Examiner—R. J. Corcoran
Attorney—Thomas Cooch, Arthur A. Smith, Jr. and Martin M. Santa

[57] ABSTRACT

A transducer comprising a stator having printed thereon a pattern adapted to form pairs of electrical poles, and a rotor movable relative to the stator and separated therefrom by a gap. Each pole of the stator's pattern is coupled to an external power source via bridge circuitry or the like such that upon the application of power a magnetic field exhibiting flux is generated, inducing a voltage proportional thereto in each pole. The rotor's surface adjacent to and opposite the stator's pole pairs is coated with two types of oppositely acting flux-altering material. MOvement of the rotor relative to the stator positions the flux-altering material on the rotor's surface relative to the stator's pole patterns, thereby altering the flux of the magnetic field about each pole, which is equivalent to altering the impedance of each pole pattern. The resulting difference in flux-induced voltage between those poles whose flux is altered in one way and those poles of oppositely altered flux, as measured by the bridge circuitry, is a measure of the mechanical displacement of the rotor with respect to the stator. The transducer may be configured to measure either angular or linear displacement and is operable either as a single-speed and/or multispeed device.

20 Claims, 10 Drawing Figures

INVENTORS:
DUNCAN B. COX, JR.
KENNETH FERTIG
BY Arthur A. Smith, Jr.
ATTORNEY

INVENTORS:
DUNCAN B. COX, JR.
KENNETH FERTIG
BY *Arthur A. Smith, Jr.*
ATTORNEY

INVENTORS:
DUNCAN B. COX, JR.
KENNETH FERTIG
BY: Arthur A. Smith, Jr.
ATTORNEY 3,641,429

POSITION-MEASURING TRANSDUCER COMPRISING A STATOR AND RELATIVELY MOVABLE FLUX-ALTERING MEMBER

The invention herein described was made in the course of work performed under a contract with the Department of the Air Force.

1. Field of the Invention

This invention relates generally to transducers and more specifically to a printed-pattern type of variable-impedance transducer.

2. Description of the Prior Art

Transducers employed as angular resolvers or synchros are known in the art as devices which convert the angular position of a rotatable shaft relative to a reference into an output electrical signal. Electromagnetic resolvers of the inductive type are constructed in the form of primary and secondary windings, each comprising a multiplicity of conductors. Often, the windings are arranged on the adjacent faces of two coaxially supported discs, the rotor disc, which is affixed to and rotates with the shaft, and the stator disc, which is the reference element. Current is passed through the windings on either the rotor or stator disc to produce an alternating magnetic field. As a result of the magnetic field, a voltage is induced in the other windings. The induced voltage is a function of the angle of rotation. In such cases, the windings may be either wire-wound or may utilize planar conducting printed patterns. Examples of this type of device using printed patterns are described in U.S. Pat. No. 2,799,835, entitled "Position Measuring Transformer," by R.W. Tripp et al. and in U.S. Pat. No. 3,284,795, entitled "Angular Resolver," by K. Fertig et al. In either configuration slip rings or rotary transformers are required on the shaft to provide input or output channels. Sliprings increase volume and cause a substantial reduction in operating life due to friction and wear. Rotary transformers, on the other hand, require a relatively substantial volume and/or result in a substantial loss in signal strength. Devices employing wire coils rather than printed patterns have the further disadvantages of limited signal bandwidth and difficulty in fabrication in applications requiring miniaturization and accuracy.

An alternate approach in the art has been to design the transducer such that both the primary and secondary windings are located on the stator disc, and the rotor comprises high-permeability material machined to form salient poles, e.g., resembling gear teeth. Angular measurement is effected through the variable coupling of magnetic fields from the stator windings, through the rotor structure, and back again. This type of design eliminates the need for slip rings or rotary transformers. (See, for example, U.S. Pat. No. 2,488,734, entitled "Dynamo Transformer"; No. 2,596,711, entitled "Electromagnetic Apparatus" and No. 2,596,712, entitled "Electromagnetic Apparatus," all by R. K. Mueller.) However, teeth protruding from both the stator and rotor discs are required for the magnetic path and to support wire windings. Hence, transducers of this type are expensive and difficult to produce in any applications requiring miniaturization. Further, the employment of wire windings and nonplanar geometries also causes difficulties in obtaining precision fabrication and substantial accuracy per unit volume.

SUMMARY OF THE INVENTION

In view of the foregoing limitations of transducers presently used in the art, it is a general object of the invention to provide an electromagnetic variable-impedance single-speed or multispeed angular or linear displacement transducer having the characteristics of small size, high accuracy and broad bandwidth.

It is another object of the invention to provide an electromagnetic variable-impedance single-speed or multispeed transducer employing printed-pattern conductors wherein the transducer obviates the need for special signal transmission linkages to the rotor and provides relatively large signal outputs.

It is another object of the invention to provide a single-speed or multispeed variable-impedance electromagnetic printed-pattern transducer which enables ease of fabrication and which provides a high degree of spatial averaging per unit volume occupied with consequent improvement in accuracy per unit volume.

These and other objects are met by a transducer comprising, in its preferred embodiment, a stator and a rotor, each having surfaces positioned opposite each other and separated so as to preclude physical contact. The stator's surface comprises electrically conductive printed patterns adapted so as to form pairs of complementary poles. The poles, in turn, are coupled to external circuitry and are excited by a source of power which generates a magnetic field about each pole. The rotor's surface, in turn, comprises two types of flux-altering material arranged in alternating sections, one type of material being such as to alter the flux in a manner opposite to the alteration caused by the other type material. Displacement of the rotor relative to the stator causes a surface interaction such as to change the flux of the magnetic field about each of the stator's poles, as measured by the voltage induced in each pole. The difference between the induced voltage of one pole pattern relative to the induced voltage of the other complementary pole pattern is a measure of the displacement of the rotor relative to the stator.

The flux-altering material on the rotor may be a combination of flux enhancement and flux attenuation material or any combination of other materials appreciably affecting in opposing ways the magnitude or phase of the magnetic flux generated in response to the stator currents. Furthermore, the only geometric restriction on the stator and rotor patterns is that they must exhibit the same periodicity.

The invention may be adapted either to the measurement of angles in rotary embodiments or to the measurement of linear position in linear embodiments. When employed as an angular resolver, the rotor and stator may be disc-shaped and coaxially supported via a rotatable shaft or other member, or the rotor and stator may be cylindrical.

In the preferred embodiment as an angular resolver, the rotor and stator are both disc-shaped and are coaxially supported via a rotatable shaft. The stator comprises a rigid structure supporting two layers of electrically conductive printed patterns, separated by a layer of dielectric material. For single-speed operation each of the two conductive layers consists of a pair of identically configured, independent printed pole patterns. For multispeed operation each of the two conductive layers consists of multiple pairs of pole patterns. The pole patterns in one layer are arranged in space quadrature relative to the pole patterns in the other layer. The number of pole pairs in one layer equals the number in the other layer. In the preferred embodiment, the combination of materials on the rotor's surface is one of low-resistivity material such as copper and high-permeability material such as mu-metal. For single-speed operation the rotor's inner surface is divided into two sections. For multispeed operation the rotor's inner surface is divided into multiple pairs of alternately arranged sections. The number of pairs of sections comprising the rotor's inner surface corresponds to the number of pole pattern pairs comprising one of the stator's conductive layers.

When the rotor is rotated relative to the stator such that the high-permeability segments of the rotor are fully opposite pole patterns of one of the stator's conductive layers, the magnetic fields produced by those pole patterns are maximally enhanced; and the self-inductance, and hence impedance, of the affected stator pole patterns is correspondingly increased. Likewise, in this position, the rotor's low-resistivity sections are fully opposite the remaining pole patterns in the same plane; and the magnetic field, and hence self-inductance and impedance, of these latter pole patterns is reduced because of the effect of circulating currents in the conducting material. As the rotor rotates relative to the stator, the impedances change accordingly. The differences between these impedances, as measured in terms of differences in induced voltages by a bridge circuit coupled to the pole patterns, varies as a periodic function of the mechanical angle of the rotor.

Since, as aforementioned, the patterns on the stator's two conductive layers are oriented relative to each other at an angle of 90°, an additional measurement of impedance difference can be obtained from the pole patterns on the stator's second conductive layer that is a periodic function of the rotor angle minus 90°.

Other objects and advantages of the invention will become apparent from the following description taken in conjunction with the accompanying figures, of which:

PREFERRED EMBODIMENT

As aforementioned, the invention may be configured as an angular position transducer (angular resolver) or as a linear displacement measuring device. Both embodiments are presented herein. In discussing the preferred embodiment of the angular resolver, attention is given to both single-speed and multispeed operation.

ANGULAR RESOLVER

Single-Speed

Figure 1:
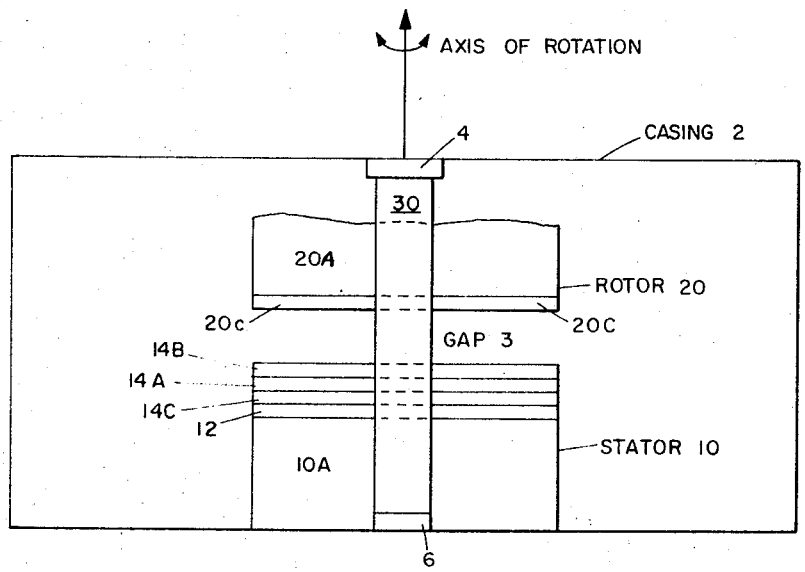
FIG. 1 is an overall cross-sectional view of the invention, as an angular resolver, showing the relationship of the stator, rotor and shaft.

As noted in FIG. 1, the resolver basically comprises stator 10 and rotor 20 coaxially supported within casing 2 and separated by gap 3 which may be as small as mechanical tolerances permit or, conversely, relatively large. (For example, the resolver has performed successfully with a gap of one-quarter inch for a rotor diameter of 3 inches.) Gap 3 is filled with an essentially nonconducting, nonmagnetic medium such as air or fluorocarbon fluid. Stator 10, which is rigidly affixed to casing 2, serves as the reference element. Rotor 20 is coupled to shaft 30 and rotatable therewith about the axis of rotation; shaft 30, in turn, is coupled to casing 2 via bearings 4 and 6.

Rotor 20 comprises support structure 20A to which is bonded as the inner surface two essentially half discs 20B and 20C. (Where the rotor and stator elements are shaft mounted, it is understood that "half discs" 20B and 20C are actually somewhat less than half the area of the rotor disc because of the shaft aperture. However, for convenience, they are referred to as half discs.) Half disc 20B comprises a layer of low-resistivity material, and half disc 20C comprises a layer of high-permeability material. Typically, the thickness of the half discs is in the order of 2 mils.

Stator 10 comprises support structure 10A to which is bonded layer 12 of high-permeability material. Also forming stator 10 and bonded to layer 12 is a disc comprising layer 14A of dielectric material, on each side of which is bonded a layer of conducting material, such as copper, out of which has been etched or otherwise printed patterns forming pole pairs 14B and 14C, respectively. The pole pairs on one layer are oriented in space quadrature relative to those on the other layer. Typically, each of the layers comprising the disc has a thickness in the order of two mils. Layer 12 is used to enhance the magnetic field caused by currents in the conducting pole patterns and to isolate the patterns from externally generated interference fields. If desired, a thin film of dielectric material may be interposed between the disc and layer 12 as a further safeguard against any possibility of short circuiting the conducting pole patterns.

Figure 2:
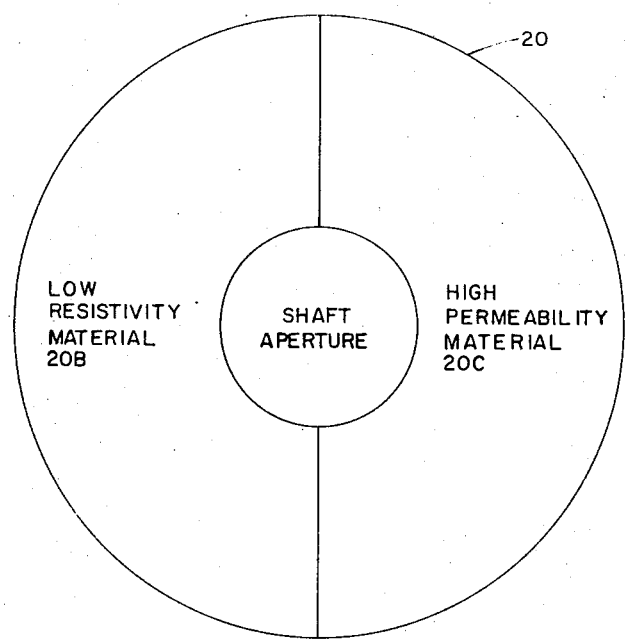
FIG. 2 depicts the rotor pattern used in the preferred embodiment of the angular resolver for single-speed operation.

A typical one-speed rotor pattern used in the preferred embodiment is shown in FIG. 2. As noted therein half disc 20B is a layer of low-resistivity material, such as copper; and half disc 20C is a layer of high-permeability material, such as mu-metal. [For purposes of the invention, however, the following alternate combinations of materials will work equally as well, to wit, one half disc may be coated with high-resistivity material, and the other half disc with low-resistivity material; or one half disc may be coated with high-permeability material and the other with low-permeability material. In short, any combination of flux-enhancement and flux-attenuation material may be used. Within the context of the invention, it is understood that one of the materials used could have essentially no effect on the magnetic field. Further, where it is desired to alter the phase of the flux rather then its magnitude, other appropriate materials work equally as well within the intended scope of the invention. The materials are not restricted to being metallic. For example, plastic compounds able to absorb (e.g., through dielectric hysteresis) appreciable power from alternating magnetic fields can be used in alternate rotor sections in combination with a material unaffected by the magnetic field.] Although not essential to the invention, in the preferred embodiment, each half disc 20B and 20C encompasses a substantial part of a 180° sector; the center part of rotor 20 is cut out to allow assembly in the transducer.

Figure 3:
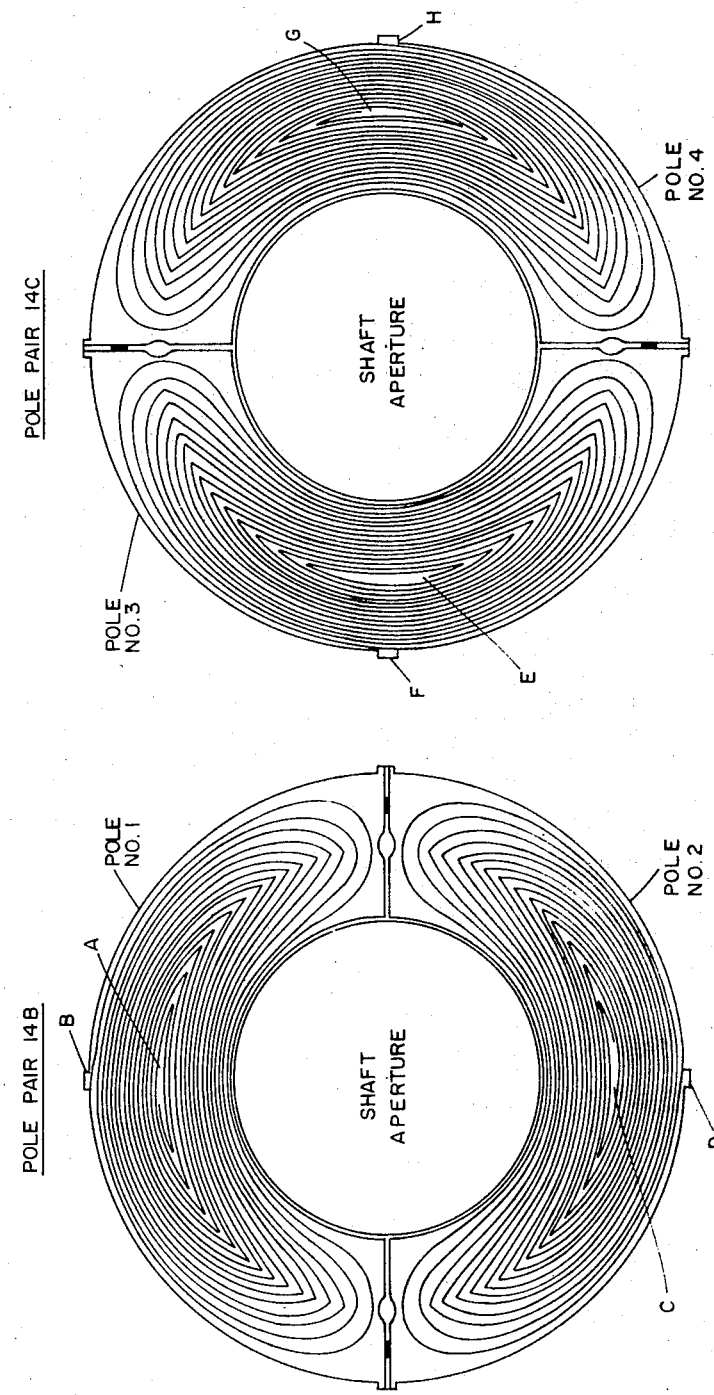
FIG. 3 depicts a typical stator pattern used in the preferred embodiment of the angular resolver for single-speed operation.

Typical one-speed stator patterns used in the preferred embodiment are shown in FIG. 3. As noted therein the patterns comprising pole pairs 14B and 14C are identically configured, the only difference being in the actual mounting whereby, as aforementioned, the patterns are oriented relative to each other at an angle of 90°. Pole pair 14B comprises opposing poles numbered 1 and 2, independently connected to external circuitry via terminals A and B for pole number 1 and C and D for pole number 2. Likewise, pole pair 14C comprises separate and opposing poles numbered 3 and 4, independently connected to external circuitry via terminals E and F for pole number 3 and G and H for pole number 4. Each pole pattern covers a substantial part of a 180° sector. The center part of stator 10 is also cut out to allow assembly in the transducer, the aperture for both the stator and rotor having the same diameter. In the preferred embodiment, each pole pattern is "-kidney shaped" or spiralled and is etched through the copper layer by one of the so-called "printed circuit" techniques. It may also be electroplated vapor deposited, or the like. It is noted that the invention is not limited to the particular stator patterns shown in FIG. 3 but will function with a wide variety of printed pole patterns. The particular pattern configuration used with the preferred embodiment was chosen because of its high inductance-to-resistance ratio which facilitates extremely accurate and sensitive measurement of inductance and hence impedance variation using standard bridge circuitry such as that shown in FIG. 4 for sine-cosine-modulated outputs, and that shows in FIG. 5 for phase-modulated outputs.

Briefly, the invention is predicated on the differential measurement of the impedance of (or, equivalently, the voltage induced by the magnetic field in) one pole pattern relative to the other pole pattern in the same plane. When rotor 20 is rotated relative to stator 10 such that the high-permeability layer of rotor 20 is fully opposite one of the pole patterns on stator 10, the magnetic field generated thereby is maximally enhanced, and the self-inductance, and hence impedance, of that pole pattern is correspondingly increased. In this position the low-resistivity layer of rotor 20 is fully opposite the other pole pattern lying in the same plane on stator 10; and the magnetic field, and hence self-inductance of this latter pole pattern, is reduced because of the effect of the circulating currents in the low-resistivity material. In other words, when the impedance of one pole pattern is a maximum, the impedance of the other opposing pole pattern in the same plane is at a minimum; as rotor 20 rotates relative to stator 10, the impedance change accordingly. The difference of the two impedances, as measured by the bridge circuit coupled to the pole patterns on stator 10, is a measure of the mechanical angle through which rotor 20 has rotated. Since the two pairs of pole patterns (i.e., pole pair 14B and pole pair 14C) are oriented relative to each other at an angle of 9020, two impedance differences can be obtained that are periodic functions of the rotor angle and of the rotor angle minus 90°, respectively. In other words, for the preferred embodiment, the variations in impedances are sinusoidal and cosinusoidal functions of the rotor angle. (It is understood that the variations are not limited thereto, but can be other periodic functions for special applications and embodiments.)

For single-speed operation, the above description is expressed mathematically as:

$$Z_1 = Z_N + z \sin\theta \qquad \text{Eq. 1}$$
$$Z_2 = Z_N - z \sin\theta \qquad \text{Eq. 2}$$
$$Z_3 = Z_N + z \cos\theta \qquad \text{Eq. 3}$$
$$Z_4 = Z_N - z \cos\theta \qquad \text{Eq. 4}$$

where $Z_1$ through $Z_4$ are the impedances of stator poles 1 through 4, respectively; $Z_N$ is the nominal impedance of each stator pole ($Z_N$ being approximately the same for each pole pattern); $\theta$ is the angle of rotor 20 with respect to stator 10; and $z$ represents the maximum impedance variation of each stator pole. (The variation is approximately equal for each pole.)

Figure 4:
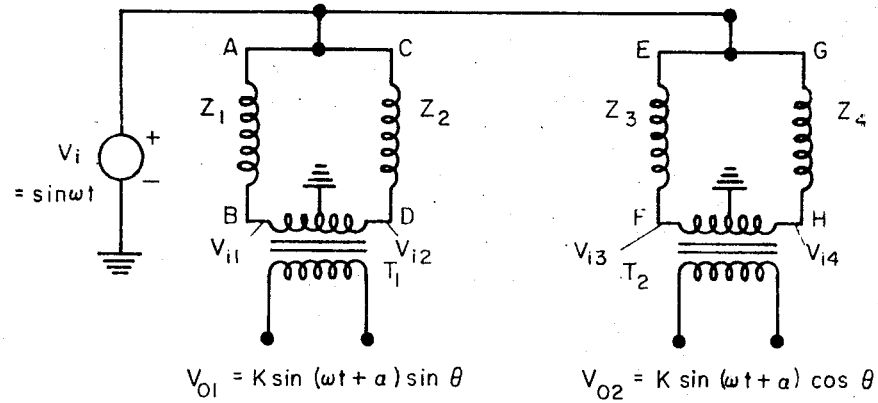
FIG. 4 is a schematic of the bridge circuit used in the preferred embodiment to obtain single-speed sine-cosine modulated outputs.

Applying the above to single-speed operation requiring sine-cosine-modulated outputs, reference is made to FIGS. 1 through 3 in conjunction with FIG. 4.

The circuitry of FIG. 4 basically comprises transformers $T_1$, $T_2$ arranged in conjunction with terminals A through H of the stator's pole patterns into a standard bridge configuration and having a common voltage source $V_i$. The output of transformer $T_1$ is a voltage $V_{o1}$ having an amplitude equal to the amplitude of the difference of the voltages $V_{i1}$ and $V_{i2}$ across terminals A–B and C–D, respectively. Likewise, the output of transformer $T_2$ is a voltage $V_{o2}$ having an amplitude equal to the amplitude of the difference of the voltages $V_{i3}$ and $V_{i4}$ across terminals E–F and G–H, respectively.

Initially, say, with $\theta=90°$, half-disc 20C of rotor 20 is fully opposite pole No. 1 of stator pole pair 14B, while half-disc 20B is fully opposite pole No. 2. The impedance $Z_1$ of pole No. 1 is maximally enhanced as aforementioned, causing a proportional decrease in the amplitude of voltage $V_{i1}$ across terminals A–B; on the other hand, the impedance $Z_2$ of pole No. 2 is at a minimum, causing a porportionate increase in the amplitude of voltage $V_{i2}$ across terminals C–D. The difference voltage measured across the primary (B–D) of transformer $T_1$ becomes:

$$V_{o1} = V_{i1} - V_{i2} = [V_i - (Z_N + z \sin\theta) i_1]$$
$$- [V_i - (Z_N - z \sin\theta) i_1]$$
$$= -2z(\sin\theta) i_1 \qquad \text{Eq. 5}$$

The sinusoidally modulated output voltage $V_{o1}$ from transformer $T_1$, having an amplitude directly proportional to the difference between the impedances $Z_1$ and $Z_2$, is:

$$V_{o1} = -2z(N_2/N_1) i_1 \sin\theta, \text{ or} \qquad \text{Eq. 6}$$
$$V_{o1} = K \sin(\omega t + \alpha) \sin\theta \qquad \text{Eq. 7}$$

where $N_1$ and $N_2$ are the transformer turns ratios, $\alpha$ is a fixed phase angle, $K$ is a constant of proportionality, $i_1$ is the sinusoidal excitation current and $\omega$ is the frequency of the excitation.

Further, when rotor 20 is aligned relative to pole pair 14B as aforementioned, its alignment relative to pole pair 14C is such that one-half of poles No. 3 and 4 are opposite rotor half-disc 20B; while the other halves of poles No. 3 and 4 are opposite half-disc 20C. The difference voltage measured across the primary (F–H) of transformer $T_2$ becomes:

$$V_{o2} = V_{i3} - V_{i4} = [V_i - (Z_N + z \cos\theta) i_2]$$
$$- [V_i - (Z_N - z \cos\theta) i_2]$$
$$= -2z(\cos\theta) i_2 \qquad \text{Eq. 8}$$

The cosinusoidally modulated output voltage $V_{o2}$ from transformer $T_2$, having an amplitude directly proportional to the difference between impedances $Z_3$ and $Z_4$, is:

$$V_{o2} = -2z (N_4/N_3) i_2 \cos\theta \qquad \text{Eq. 9}$$
$$= K \sin(\omega t + \alpha) \cos\theta \qquad \text{Eq. 10}$$

where $i_2$ is the other sinusoidal excitation current.

For the specific alignment cited above as an example, it is obvious that when $V_{o1}$ is at a maximum, $V_{o2}$ is zero (since $V_{i3} = -V_{i4}$). As rotor 20 rotates relative to stator 10, however, the value of $\theta$ and hence of impedances $Z_1$ through $Z_4$ changes correspondingly, with proportional changes in $V_{o1}$ and $V_{o2}$.

Figure 5:
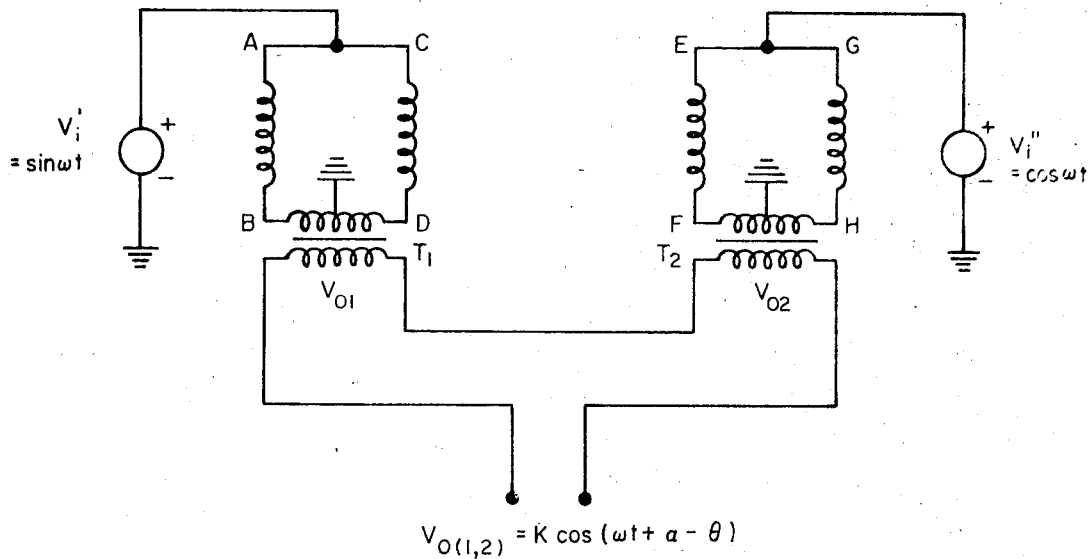
FIG. 5 is a schematic of the bridge circuit used in the preferred embodiment to obtain single-speed phase-modulated outputs.

Alternatively, where a phase-modulated output is desired, the bridge circuit is configured as shown in FIG. 5. As noted, the circuitry of FIG. 5 is similar to that of FIG. 4, except that a separate voltage source is coupled to each transformer, i.e., $V_i'$ for transformer $T_1$, and $V_i''$ for transformer $T_2$; and the secondaries are connected in series.

Referring now to FIGS. 1 through 3 in conjunction with FIG. 5, the output voltage across the primary of transformer $T_1$ remains as expressed in Equations 6 and 7. Poles No. 3 and 4, however, are excited with orthogonal voltage $V_i'' = \cos\omega t$, resulting in an output voltage across the primary of transformer $T_2$ of:

$$V_{o2} = K \cos(\omega t + \alpha) \cos\theta \qquad \text{Eq. 11}$$

and the sum of the two outputs $V_{o1}$ and $V_{o2}$ is desired phase-modulated signal, $$V_{o(1,2)} = K \cos(\omega t + \alpha - \theta) \qquad \text{Eq. 12}$$

Multispeed

For the preferred embodiment, subject invention functions as a multispeed transducer by increasing the number of pairs of pole patterns on stator 10 and, by the same amount, the number of pairs of low-resistivity and high-permeability sections on rotor 20. Although the number of stator pole pairs preferably equals the number of rotor section pairs, the invention is not limited to this relationship. The only restriction in this regard is that the rotor patterns must exhibit the same periodicity as that of the stator patterns, i.e., the spatial harmonic frequencies of the patterns must coincide. This can be achieved by appropriately shaping and positioning the rotor sections so as to produce a periodicity equal to that of the stator's patterns, without necessarily requiring that the number of stator poles equal the number of rotor sections.

Figure 6:
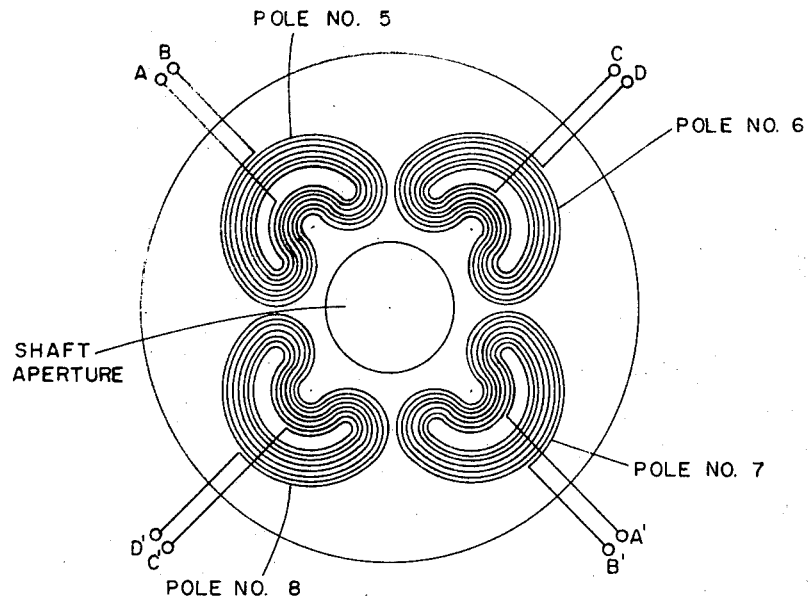
FIG. 6 shows a typical stator pattern used in the preferred embodiment of the angular resolver for two-speed operation.

A stator pattern used in the preferred embodiment for two-speed operation is shown in FIG. 6. As noted therein, the pattern printed on one surface of the stator disc now comprises four planar, conducting pole patterns 5 through 8, rather than one pair as is the case for single-speed operation. Poles 5 and 7 provide impedance variations of one type or "polarity" and have terminals A–B and B'–A', respectively. Poles 6 and 8 provide impedance variations of the opposite type or "polarity" and have terminals C–D and D'–C', respectively. The pattern printed on the other surface of the stator disc is identical. As before, the pole patterns on one of the disc's surfaces are in space quadrature relative to the pole patterns on the other surface.

Each of the terminals for the pole patterns of stator 10 is coupled to external bridge circuitry, and operation of the resolver is as previously described. Again, both sine-cosine-modulated and phase-modulated outputs are attainable. For example, where sine-cosine outputs for two-speed operation are desired, the bridge circuit of FIG. 4 may be modified as follows. For transformer $T_1$, electrical terminals B'–A' are connected in series (or parallel) with terminals A–B, and terminals D'–C' are similarly connected with terminals C–D. For transformer $T_2$ the terminals of the pole patterns on the other surface of the stator disc are likewise connected (i.e., poles providing like impedance variations being coupled together). The bridge circuitry of FIG. 5 may be similarly modified for phase-modulated data where two-speed operation is desired.

Figure 7:
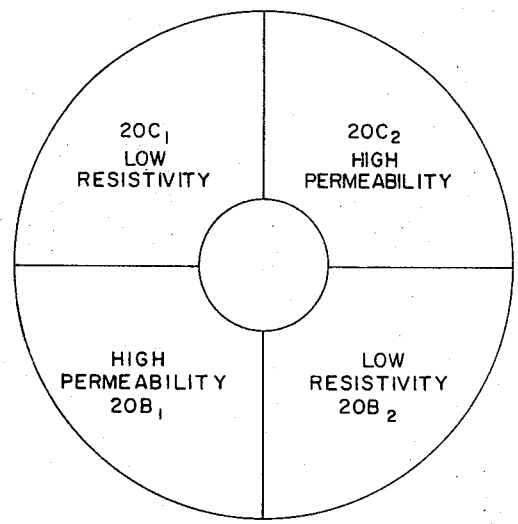
FIG. 7 shows a typical rotor pattern used in the preferred embodiment of the angular resolver for two-speed operation.

A typical rotor pattern used in the preferred embodiment for two-speed operation is shown in FIG. 7. As noted therein, the surface of rotor 20 is divided into four sections of approximately equal area, two of the sections $20C_1$ and $20B_2$ comprising low-resistivity material and the other two sections $20C_2$ and $20B_1$, comprising high-permeability material. The sections are arranged such that the low-resistivity and high-permeability material alternate.

LINEAR DISPLACEMENT APPLICATION

Figure 8A:
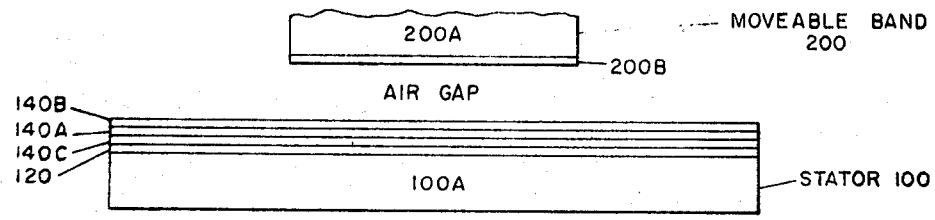
FIGS. 8A and 8B show an alternate embodiment of the invention for linear displacement measurements.

The invention also functions as a linear displacement measuring device by replacing the disc-shaped rotor and stator with horizontal strips or bands as configured in FIG. 8A. The principle of operation, however, remains unchanged.

Stator 100 of FIG. 8A is a stationary band which comprises support structure 100A to which is bonded layer 120 of high-permeability material. Also forming stator 100 and bonded to layer 120 is a band comprising layer 140A of dielectric material, on both sides of which is bonded a layer of low-resistivity material, such as copper, in which has been etched or otherwise printed patterns forming pole pairs 140B and 140C, respectively. Again, the pole pattern pairs on one conducting layer are oriented in space quadrature relative to those on the other layer.

Moveable band 200 functions analogously to the "rotor" in the angular resolver application. Bonded to inner surface 200A thereof are sections 200B of alternately arranged low-resistivity and high-permeability material. Band 200 is separated from stator 100 by a gap filled with an appropriate insulating media. The device operates in a manner identical to the operation previously described for the angular resolver, except that movement is linear rather than angular. In such an application there is obviously no necessity for a shaft.

As in the case of the angular resolver, movement of band 200 longitudinally relative to stator 100 positions the low-resistivity and high-permeability material on the surface of band 200 relative to the stator's pole patterns, thereby varying the impedance of each pole pattern. The differences between the impedances are measured by bridge circuitry coupled to the stator's pole patterns in a manner similar to that shown in FIGS. 4 and 5.

Figure 8B:
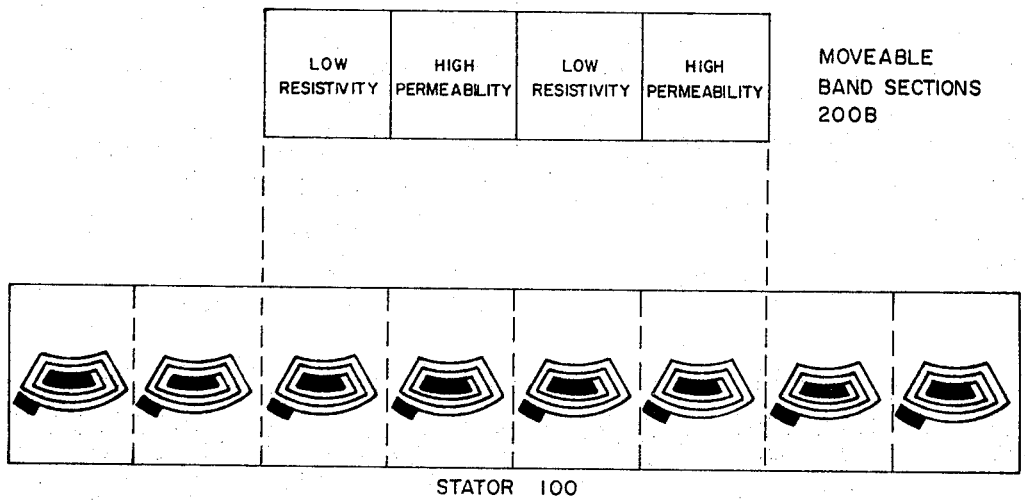

FIG. 8B shows typical rotor and stator patterns for use with a version of the linear displacement transducer. Here again, the principle of operation is identical to that previously described for the angular resolver, except that a linear rather than angular measurement is obtained. The number of sections on the rotor may be either greater than or less than the number of poles on the stator, but the basic periodicity of the rotor and stator elements must be the same.

ADDITIONAL COMMENTS

Figure 9:
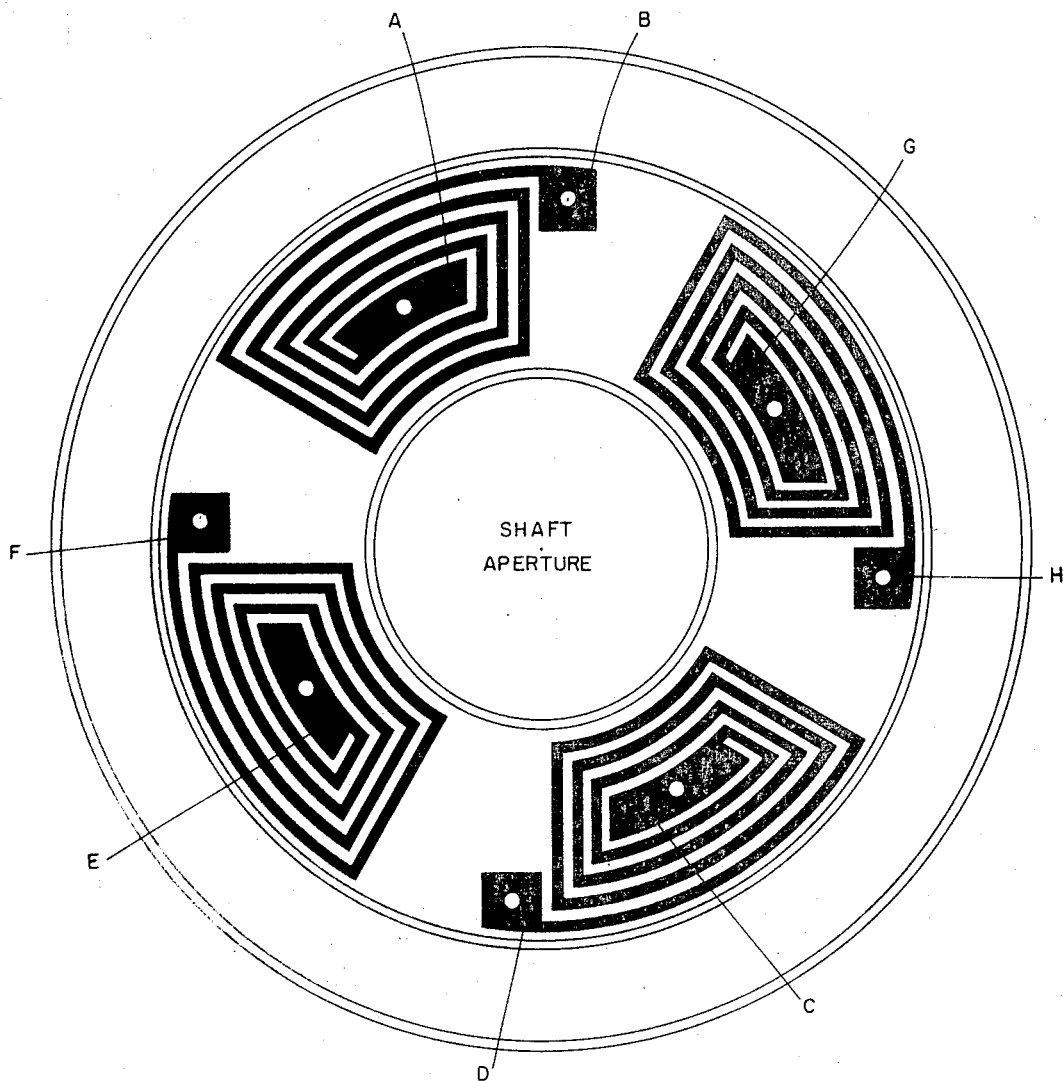
FIG. 9 shows an alternate stator pattern that can be used with the rotor pattern of FIG. 2.

Although a specific embodiment of the invention has been described herein, it is apparent that changes may be made and still remain within the scope of the invention. For example, in both the angular resolver and linear displacement embodiment, the stator was described in terms of two surfaces, each of which had printed thereon pairs of pole patterns, the pole patterns of one surface being in space quadrature with those of the other. It is obvious that the pole pattern pairs may be arranged in space quadrature and yet all be within the same plane. This may be accomplished by printing the pole pairs on the stator all in one plane, but such that each pattern is oriented relative to its adjacent patterns at an angle of 90°. For example, FIG. 9 shows a stator pattern, comprising the pair of poles A–B and C–D in the same plane with the orthogonal pair of poles E–F and G–H. This pattern can be used with the aforementioned single-speed rotor pattern in FIG. 2. In fact, the pattern of FIG. 9 may also be used in conjunction with, say, a three-speed rotor pattern comprising three sections each of high-permeability and low-resistivity material, the sections being alternately arranged as aforementioned.

Similarly, various alternate receiver circuits may be used in place of those shown in FIGS. 4 and 5. For example, if two identical stator pattern layers such as shown in FIG. 9 are superimposed in identical orientations one above the other on the stator, the pole pairs on one layer can be used as signal receivers while the pole pairs on the other layer are used as excitors. Because of the close proximity of each conducting section in a stator receiver layer with the corresponding conducting section of the other stator layer, the signal generated in each receiver pole by the magnetic field will be essentially the same as that generated in the corresponding excitation pole in the other stator layer. The receiver poles in this arrangement are used instead of the bridge transformers shown previously and provide the output modulated signals directly. The use of receiver poles to replace elements of a bridge is a technique often used in the design of microsyns.

When the patterns in overlapping stator layers are orthogonal, as in FIG. 3, (rather than identically oriented as in the previous example), there can still be some cross-coupling between overlapping patterns such as to slightly distort the received modulations from their ideal sine and cosine form. If the crosscoupling is objectionable, however, it can easily be avoided either by resorting to nonoverlapping stator patterns as shown in FIG. 9 or by coding (modulating) the excitation signals to allow isolation on the basis of the codes. For example, if the excitation currents are modulated as:

$$i_1 = \sin \omega_c t \sin \omega t \qquad \text{Eq. 13}$$
$$i_2 = \cos \omega_c t \sin \omega t \qquad \text{Eq. 14}$$

then the bridge outputs analogous to equations 7 and 10 become $$V_{o1} = K \sin \omega_c t \sin (\omega t) \sin\theta + \cos (\omega_c t) G_2(\theta, t) \qquad \text{Eq. 15}$$
$$V_{o2} = K \cos \omega_c t \sin (\omega t) \cos \theta + \sin (\omega_c t) G_1(\theta, t) \qquad \text{Eq. 16}$$

where $G_1(\theta, t)$ and $G_2(\theta, t)$ are the cross-coupled signals. Synchronous demodulation of the output waveforms by $\sin \omega_c t$ and $\cos \omega_c t$ allows the second (cross-coupled) terms in equations 7 and 10 to be rejected in favor of the desired (direct-coupled) first terms. In fact, it is desirable to use modulated waveforms for other reasons, such as to enhance the magnitude of the received signal while preserving a low signal frequency $\omega$. (Reference is again made to U.S. Pat. No. 3,284,795 by K. Fertig et al.)

In certain circumstances, it may be desirable to utilize cross-coupled signals, which vary in a periodic way as the rotor is rotated, and such use would not exceed the scope of this invention.

It is obvious from the foregoing description that, in general, with at least one stator pole excited, voltages that are periodically dependent upon the rotor angle will be generated in each of the stator poles—particularly in those stator poles that overlap to some extent the excited pole(s). By appropriately shaping the poles to provide the same periodicity as that of the rotor, the voltages generated in the unexcited poles can be made to vary in a sinusoidal (or other desired) manner with respect to the rotor angle. Then voltages can be sensed individually or appropriately combined in external circuitry.

Furthermore, it is clear that the number of overlapping surface layers incorporating printed stator pole patterns can be extended to any number larger than two without exceeding the scope of the invention.

Similarly, various alternate rotor patterns may be employed, with the only restriction being that the rotor pattern must exhibit the same periodicity as that of the stator pattern. For example, the rotor pattern could comprise a large number of alternating sections arranged so that the densities of surface distribution of the two materials would be approximately sinusoidal. In general, the rotor surface can be composed of any number of arrangements of sections or subsections of the aforementioned flux-altering materials, with the only restriction on the shape of each section or subsection being that the composite rotor pattern must provide the desired periodicity in the distribution of flux-altering properties.

Further, although the rotor and stator described in the preferred embodiment of the angular resolver are disc shaped, other configurations are intended to be within the scope of the invention. For example, the invention applies equally as well to a cylindrical resolver where the rotor is commonly the shaft and the stator the case. In such cases, the patterns would be printed on the curved cylindrical surfaces.

Having thus described our invention, we claim:

1. A position-measuring transducer comprising:
   a. a stator having electrically conducting material out of which is printed a pattern adapted to form at least an even number of pairs of electrical poles at least one of which, upon the application of electrical power, generates a magnetic field exhibiting flux, said flux inducing a voltage proportional thereto in each of said poles, said pattern having a characteristic periodicity;
   b. a first means moveable relative to said stator and separated therefrom by a gap, said first means having a surface adjacent to and opposite said poles of said stator, said surface being divided into at least a first section and a second section, said first section comprising flux-altering material of a first class and said second section comprising flux-altering material of a second class which alters said flux in a manner which differs from that of said first class of material, wherein the shape and position of said sections are such as to result in a characteristic periodicity equal to the periodicity of said stator pattern;
   c. power means for energizing said stator poles;
   d. means for moving said surface of said first means relative to said stator pattern, thereby altering the flux of said magnetic field as a function of said movement; and
   e. second means coupled to said stator poles for measuring the difference between the voltages induced in those of said poles whose flux is altered by said first class of said first means material and those whose flux is altered by said second class of said first means material.

2. The transducer of claim 1 wherein one half of said pole pairs being arranged in space quadrature relative to the second half of said pole pairs.

3. The transducer of claim 2 wherein said stator comprises one surface coated with said conducting material and wherein both said first half and said second half of said pole pairs are printed in said surface.

4. The transducer of claim 2 wherein said stator comprises a first surface and a second surface, said second surface located opposite to said first surface, both of said surfaces coated with said conducting material, and further comprises electrically insulating material separating said two surfaces, and wherein said first half of said pole pairs is printed on said first surface and said second half of said pole pairs is printed on said second surface.

5. The transducer of claim 1 wherein said flux-altering material of said first class enhances said flux and said flux-altering material of said second class attenuates said flux.

6. The transducer of claim 5 wherein said flux-enhancement material is high-permeability material and wherein said flux-attenuation material is low-resistivity material.

7. The transducer of claim 5 wherein said flux-enhancement material is high-permeability material and wherein said flux-attenuation material is low-permeability material.

8. The transducer of claim 5 wherein said flux-enhancement material is high-resistivity material and wherein said flux-attenuation material is low-resistivity material.

9. The transducer of claim 1 wherein said flux-altering material alters the phase of said flux.

10. The transducer of claim 1 wherein said first means is a rotor and wherein said movement of said rotor relative to said stator is angular.

11. The transducer of claim 10 wherein said stator and said rotor are configured as discs coaxially mounted with respect to each other.

12. The transducer of claim 10 wherein said stator and said rotor are configured as cylinders.

13. The transducer of claim 1 wherein said stator and said first means are configured as bands and wherein said movement of said first means relative to said stator is linear.

14. A position measuring transducer comprising:
   a. a stator having electrically conducting material out of which is printed a pattern adapted to form $n$ pairs of identically configured, electrical poles, $n$ being an even-numbered integer from two to infinity, wherein the first half of said pole pairs are arranged on said stator in space quadrature relative to the second half of said pole pairs, and wherein the application of electrical power to said poles generates a magnetic field exhibiting flux, said flux inducing a voltage proportional thereto in each of said poles, said pattern having a characteristic periodicity;
   b. a first means moveable relative to said stator and separated therefrom by a gap, said first means having a surface adjacent to and opposite said stator pole pairs, said surface being coated with at least one pair of alternately arranged sections of flux-enhancement and flux-attenuation material, wherein the number of said pairs of said sections corresponds to $n/2$ of said stator pole pairs, and wherein said sections are shaped and positioned such as to result in a characteristic periodicity identical to the periodicity of said stator pattern;
   c. electrical power means for energizing said stator poles;
   d. means for moving said surface of said first means relative to said stator poles, thereby varying the flux of the magnetic field of each of said stator poles as a function of said movement;
   e. second means coupled to said first half of said pole pairs for measuring the difference between the voltage induced in those of said poles whose flux is enhanced and the voltage induced in those of said poles whose flux is attenuated; and
   f. third means coupled to said second half of said pole pairs for measuring the difference between the voltage induced in those of said poles whose flux is enhanced and the voltage induced in those of said poles whose flux is attenuated.

15. The transducer of claim 14 wherein said first means is a rotor and further wherein said stator and said rotor are configured as discs coaxially mounted with respect to each other, and wherein said movement of said rotor relative to said stator is angular.

16. The transducer of claim 14 wherein said stator and said first means are configured as bands, and wherein said movement of said first means relative to said stator is linear.

17. The transducer of claim 14 wherein said stator and said first means are configured as cylinders.

18. The transducer of claim 14 wherein said electrical power means is a voltage source.

19. The transducer of claim 14 wherein both said second means and said third means are bridge circuits.

20. A position measuring transducer comprising:
   a. stator having electrically conducting material out of which is printed a pattern adapted to form at least an even number of pairs of electrical poles at least one of which, upon the application of electrical power, generates a magnetic field exhibiting flux, said flux inducing a voltage proportional thereto in each of said poles, said pattern having a characteristic periodicity;
   b. a first means moveable relative to said stator and separated therefrom by a gap, said first means having a surface adjacent to and opposite said poles of said stator, said surface being divided into at least first section and a second section, said first section comprising flux-altering material of a first class and said second section comprising flux-altering material of a second class which alters said flux in a manner which differs from that of said first class of material, wherein the shape and position of said sections are such as to result in a characteristic periodicity equal to the periodicity of said stator pattern;
   c. power means for energizing said stator poles;
   d. means for moving said surface of said first means relative to said stator pattern, thereby altering the flux of said magnetic field as a function of said movement; and e. second means coupled to said stator poles for measuring the voltages induced in those of said poles whose flux is altered by said first class of said first means material and those whose flux is altered by said second class of said first means material.

* * * * *